US007441004B2

(12) United States Patent
Lue Chee Lip et al.

(10) Patent No.: US 7,441,004 B2
(45) Date of Patent: Oct. 21, 2008

(54) METHOD AND SYSTEM FOR PROCESSING A VISITOR REQUEST OVER AN INTRANET

(75) Inventors: Cathy A. Lue Chee Lip, Manassas, VA (US); Jill E. Garrison, Stafford, VA (US); Frederick M. Korich, Manassas, VA (US); Elizabeth R. Washington, Warrenton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 484 days.

(21) Appl. No.: 09/988,907

(22) Filed: Nov. 20, 2001

(65) Prior Publication Data
US 2002/0099794 A1    Jul. 25, 2002

Related U.S. Application Data

(60) Provisional application No. 60/252,823, filed on Nov. 22, 2000.

(51) Int. Cl.
*G06F 15/16* (2006.01)
*G06F 7/00* (2006.01)

(52) U.S. Cl. .................................. 709/206; 707/104.1
(58) Field of Classification Search ......... 709/201–253; 707/3, 6, 10, 104.1; 705/1; 715/511
See application file for complete search history.

(56) References Cited

U.S. PATENT DOCUMENTS

| 4,654,793 | A |   | 3/1987  | Elrod ............................ 364/401 |
| 4,806,743 | A |   | 2/1989  | Thenery ....................... 235/472 |
| 4,937,855 | A | * | 6/1990  | McNab et al. .......... 379/102.06 |
| 5,019,697 | A |   | 5/1991  | Postman ....................... 235/441 |
| 5,377,355 | A | * | 12/1994 | Hager et al. .................. 715/511 |
| 5,781,901 | A | * | 7/1998  | Kuzma .......................... 707/10 |
| 5,936,542 | A |   | 8/1999  | Kleinrock et al. ....... 340/825.34 |
| 6,069,555 | A | * | 5/2000  | Skitek et al. ............ 340/286.14 |
| 6,194,992 | B1 |   | 2/2001  | Short et al. ................... 340/5.9 |
| 6,356,909 | B1 | * | 3/2002  | Spencer ........................ 707/10 |
| 6,408,337 | B1 |   | 6/2002  | Dietz et al. .................. 709/229 |
| 6,496,595 | B1 | * | 12/2002 | Puchek et al. ................ 382/124 |
| 6,504,470 | B2 | * | 1/2003  | Puchek et al. ............... 340/5.53 |
| 6,507,865 | B1 | * | 1/2003  | Hanson et al. ............. 705/36 R |
| 6,704,906 | B1 | * | 3/2004  | Yankovich et al. .......... 715/505 |
| 6,794,986 | B2 | * | 9/2004  | Puchek et al. ............... 340/5.53 |
| 6,971,029 | B1 | * | 11/2005 | Avery, IV et al. ............. 726/26 |
| 6,976,032 | B1 | * | 12/2005 | Hull et al. ................. 707/104.1 |
| 6,976,269 | B1 | * | 12/2005 | Avery et al. .................... 726/2 |

(Continued)

*Primary Examiner*—Nathan L Flynn
*Assistant Examiner*—J Bret Dennison
(74) *Attorney, Agent, or Firm*—Allen, Dyer, Doppelt, Milbrath & Gilchrist, P.A.

(57) ABSTRACT

A method for processing a visitor request includes filling-out and submitting a visitor request form over an intranet, and creating a database on the visitor based upon the filled-out visitor request form. A visitor approval request message is transmitted via e-mail to at least one evaluator based upon the visitor database if approval is required. The visitor approval request message has a hyperlink to the filled-out visitor request form. An approval recommendation by the evaluator is submitted via e-mail, and the filled-out visitor database is updated. If approval is received from all evaluators, then the filled-out visitor request form is validated. A visitor badge is issued based upon a validated filled-out visitor request form.

40 Claims, 2 Drawing Sheets

U.S. PATENT DOCUMENTS

| | | |
|---|---|---|
| 2001/0054046 A1* | 12/2001 | Mikhailov et al. .......... 707/500 |
| 2002/0093425 A1* | 7/2002 | Puchek et al. ............... 340/540 |
| 2002/0094111 A1* | 7/2002 | Puchek et al. ............... 382/115 |
| 2002/0099794 A1* | 7/2002 | Lue Chee Lip et al. ..... 709/218 |
| 2003/0034876 A1* | 2/2003 | Puchek et al. ............... 340/5.53 |
| 2003/0041003 A1* | 2/2003 | Kayser, III ................... 705/37 |
| 2006/0026283 A1* | 2/2006 | Trueba ........................ 709/225 |
| 2006/0041542 A1* | 2/2006 | Hull et al. ...................... 707/3 |

* cited by examiner

METHOD AND SYSTEM FOR PROCESSING A VISITOR REQUEST OVER AN INTRANET

RELATED APPLICATION

This application is based upon prior filed provisional application Ser. No. 60/252,823 filed Nov. 22, 2000, the entire contents of which are incorporated herein by reference.

FIELD OF THE INVENTION

The present invention relates to the field of data processing, and, more particularly, to a method and system for processing a visitor request form.

BACKGROUND OF THE INVENTION

Large companies typically require employees to wear a badge as long as they are on company property. Security personnel and receptionists are better able to determine if a person entering the company is actually an employee when they are wearing a badge. Employee badges thus help to prevent unauthorized entry of non-employees, who may intend to steal company secrets once they are on company grounds, for example.

If a non-employee is to enter a company, such as a supplier or customer, for example, then this non-employee is considered a visitor. As with employees, a visitor is also required to wear a badge, i.e., a visitor's badge. Before a visitor can receive a visitor's badge, a visitor request form is mailed to a visitor administrator within the company. The visitor request form is typically prepared and mailed by the person hosting the visitor. Depending on the classification of the visitor and the nature of the visit, various approvals may be required.

For instance, if the visitor is a non-U.S. citizen without an alien registration card or a person who represents a foreign company, for example, then the visitor is classified as a foreign visitor. A foreign visitor requires the approval of an import/export administrator. A paper copy of the visitor request form is mailed to the import/export administrator. Approval or non-approval of the visitor by the import/export administrator is then mailed back to the visitor administrator.

Moreover, if classified material is to be discussed with the foreign visitor, then approval from a security administrator may also be required. A paper copy of the visitor request form is mailed to the security administrator. Approval or non-approval of the visitor by the security administrator is then mailed back to the visitor administrator.

Based upon the approval or non-approval replies received from the applicable administrators, the visitor administrator notifies the host whether or not the visitor request form is validated, i.e., authorized. The above described process is labor intensive. That is, all correspondence between the employee hosting the visitor, the visit administrator, and the corresponding administrators requiring their approval are self-initiated.

SUMMARY OF THE INVENTION

In view of the foregoing background, it is therefore an object of the present invention to provide a method and associated system that improves the processing of a visitor request within a company or organization.

This and other advantages, features and objects in accordance with the present invention are provided by a method for processing a visitor request over an intranet. The intranet includes a plurality of users enrolled therein with each user having associated personnel information stored within the intranet.

The method preferably includes filling-out and submitting the visitor request form over the intranet, and creating a database on the visitor based upon information provided in the filled-out visitor request form. A visitor approval request message is preferably transmitted via e-mail to at least one evaluator based upon the visitor database if approval is required. The visitor approval request message preferably has a hyperlink to the filled-out visitor request form. An approval recommendation by the evaluator is preferably submitted via e-mail for updating the visitor database.

The e-mail messages are easily transmitted and received between users within the intranet for processing the filled-out visitor request form. In addition, the hyperlinks embedded within the e-mail messages allows the evaluators to access the filled-out visitor request form to provide a user friendly and efficient method of distributing and validating the filled-out visitor request form within an organization or company. The e-mail corresponding to the visitor approval request message may be transmitted at least in part over the intranet, and the e-mail corresponding to the approval recommendation may also be transmitted at least in part over the intranet.

If a user filling-out and submitting the visitor request form is not hosting the visitor, then the method preferably further comprises identifying a host of the visitor in the filled-out visitor request form, and transmitting a visitor certification request message via e-mail to the host. The visitor certification request message also preferably has a hyperlink to the filled-out visitor request form. A certification recommendation is submitted by the host via e-mail for updating the visitor database.

Updating the visitor database preferably comprises validating the filled-out visitor request form if approval is received from all evaluators. The method preferably further comprises issuing a visitor badge based upon a validated filled-out visitor request form. In addition, the user filling-out and submitting the visitor request form is notified via e-mail whether or not the visit is approved.

The visitor badge may be either an escort required badge or a no escort required badge. The type of badge is based upon classification of the visitor as being either a regular visitor or a foreign visitor. A regular visitor includes at least one of a U.S. citizen, and a non-U.S. citizen with an alien registration card. A foreign visitor includes at least one of a non-U.S. citizen without an alien registration card, a person representing a foreign company, and a person having dual citizenship.

If the visitor is classified as a foreign visitor, then the evaluator includes an import/export administrator. If classified material is to be discussed with the visitor, then the evaluator includes a security administrator if approval is required.

Another aspect of the present invention relates to an intranet for processing a visitor request. The intranet preferably comprises a first software module for filling-out and submitting a visitor request form, and a second software module for creating a visitor database on the visitor based upon information provided in the filled-out visitor request form. A third software module is for preferably transmitting a visitor approval request message via e-mail to at least one evaluator based upon the visitor database if approval is required, with the visitor approval request message having a hyperlink to the filled-out visitor request form. A fourth software module is for preferably submitting an approval recommendation by the at least one evaluator for updating the visitor database.

Yet another aspect of the present invention is directed to a computer-readable medium having stored thereon a data structure, and comprising a first data field containing data representing a visitor request form, with the filled-out visitor request form to be submitted over an intranet. The computer-readable medium further includes a second data field containing data representing an e-mail message having a hyperlink to the data representing the filled-out visitor request form, with the e-mail message to be transmitted to at least one evaluator if approval is required. A third data field preferably contains data representing an approval recommendation by the at least one evaluator, with the comments to be transmitted via e-mail.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
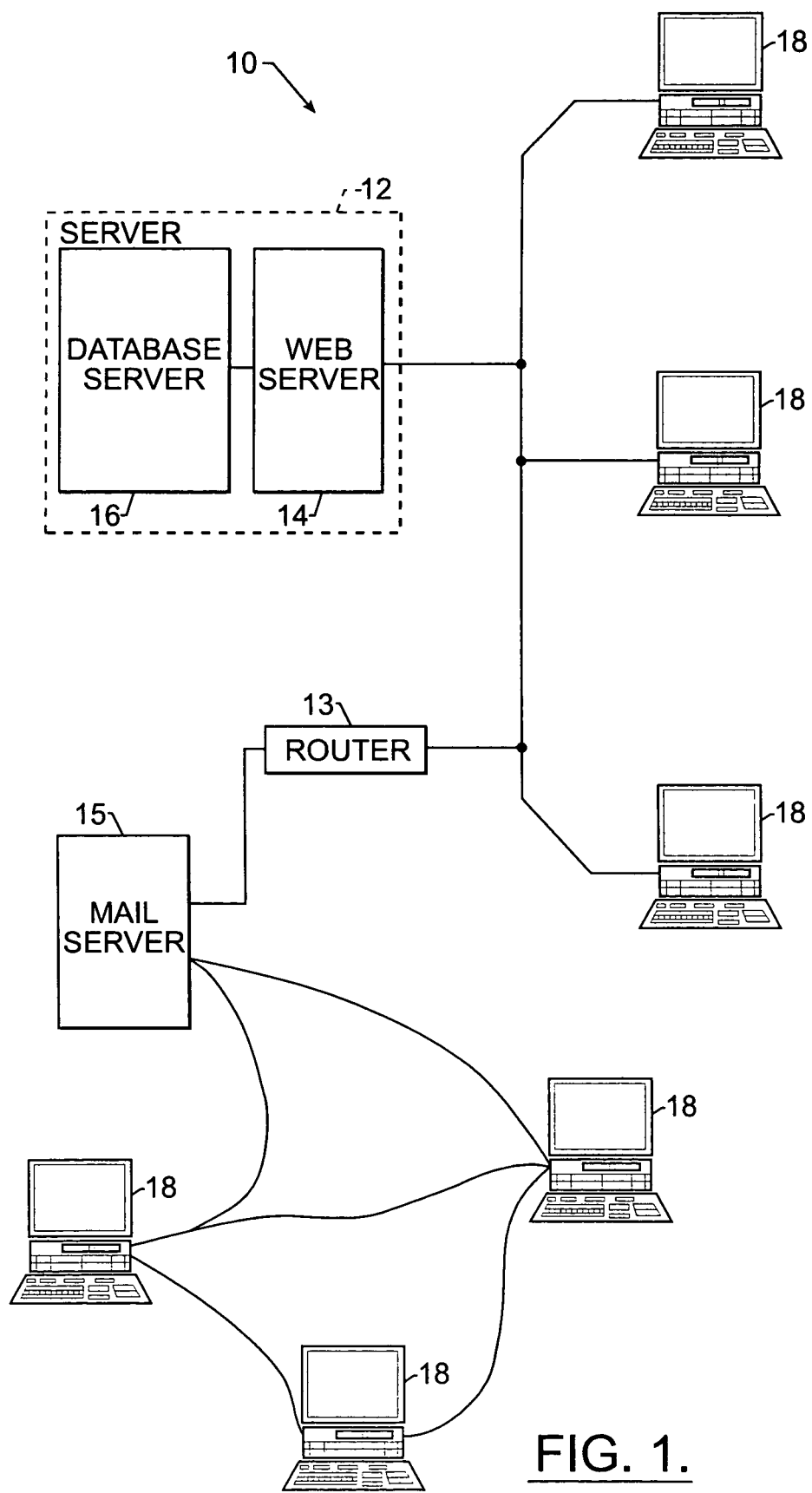
FIG. 1 is a schematic diagram of an intranet system used to implement a visitor information system (VIS) in accordance with the present invention.

A visitor information system (VIS) in accordance with the present invention is implemented in an intranet system 10, as shown in FIG. 1. The intranet system 10 will also be referred herein as simply the intranet. The intranet 10 may be localized within a corporation or business site, or may even be configured to link more than one division of a corporation together. The intranet 10 includes a plurality of users enrolled therein with each user having associated personnel information stored within the intranet.

The intranet system 10 is separated from the rest of the internet by a firewall. A firewall is a hardware/software combination that protects the intranet 10 from unauthorized users, as readily understood by those skilled in the art.

A key component of the intranet 10 is an e-mail system and a web browser for implementing the VIS. The e-mail system may use normal internet e-mail addresses, except that it routes traffic within an organization so the e-mail need not travel outside the intranet 10. Internal routers 13 and mail servers 15 send the mail to other corporation employees via the internet 10 if necessary. E-mail that travels to and from the internet 10 must go through the firewall. The VIS may also be implemented over the internet using an encrypted or secured connection. For instance, remote sites would then be able to upload information from the intranet server 12.

E-mail messages are easily transmitted and received between users within the intranet 10 for providing approval request messages and validation for a particular visitor request form. Furthermore, hyperlinks embedded within the approval request messages allows an evaluator to access a particular visitor information form, as will be described in greater detail below.

The intranet 10 offers access only to enrolled or authorized users. That is, each user requires a selected password to match their user name prior to filling-out and submitting a visitor request form. The intranet server 12 processes the method according to the present invention. In one embodiment, the server 12 includes a web or document server 14 that interfaces with a separate database server 16. Alternatively, the web server 14 and the database server 16 can be formed as a single server 12, wherein the server would include a hierarchical tree structure containing files pertaining to those stored in the database server.

The server 12 is not limited to any particular operating system for implementing the VIS. Individual computers 18 are connected to the server 12. In one embodiment, each personal computer 18 includes a web browser since the VIS is web-based.

Information necessary for the VIS is stored within the database server 16. In one embodiment, the intranet 10 uses active server web pages instead of static web pages, as readily understood by those skilled in the art. The web server 14 thus uses the active server pages to interact with the database server 16 to extract the necessary information and construct each hypertext markup language (html) page to be provided to the user. Whenever a change is made to any of the displays of the visitor request form, these displays are automatically updated by the web server 14 so that each time a user logs into the VIS, the web server 14 provides the updated pages.

Figure 2:
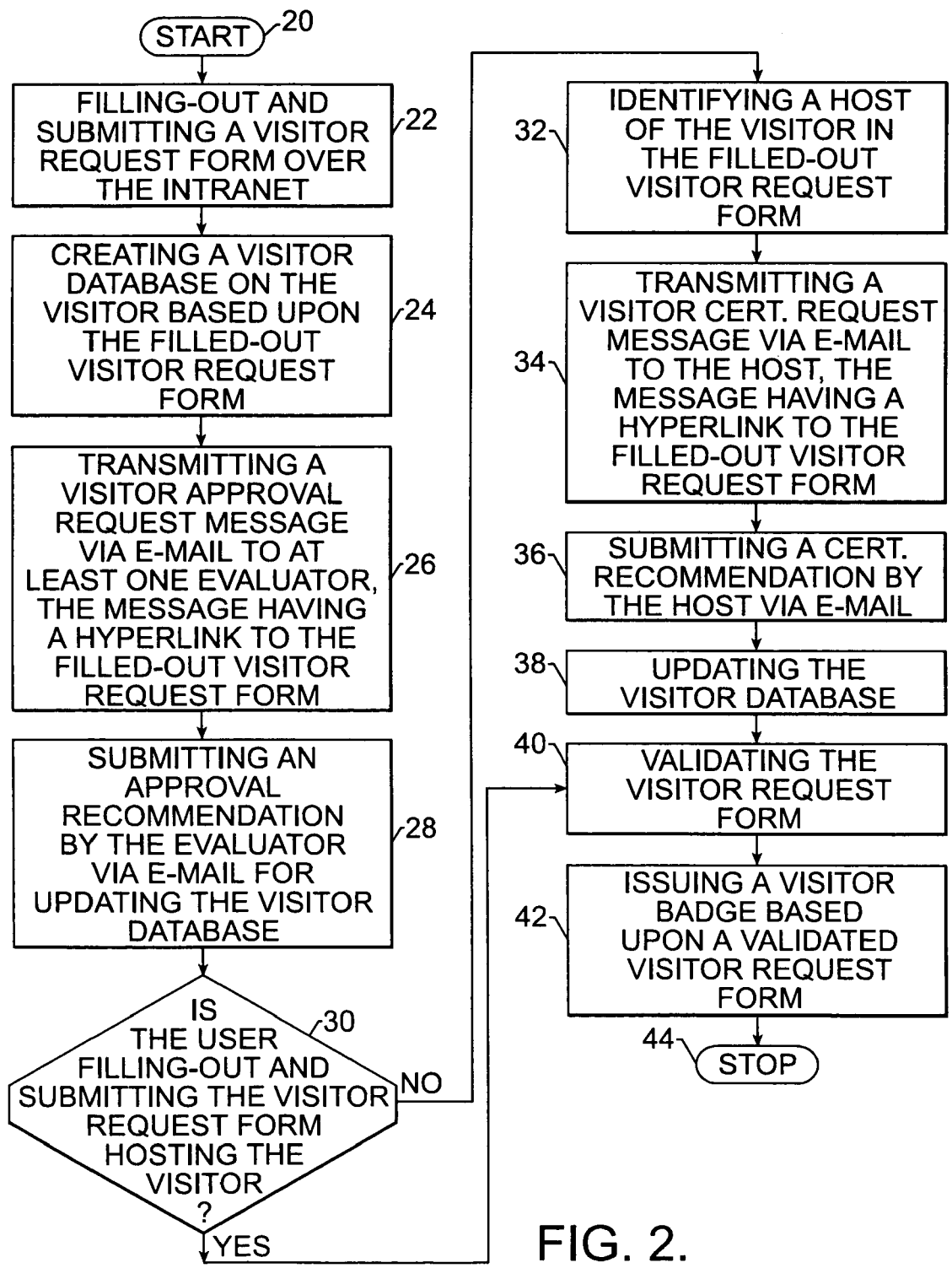
FIG. 2 is a flowchart illustrating processing of a visitor request over an intranet in accordance with the present invention.

Referring now to FIG. 2, a flowchart illustrating distribution of a visitor request over an intranet 10 in accordance with the present invention will be described. From the start (Block 20), a visitor request form is filled-out and submitted for a visitor over the intranet 10 at Block 22. A visitor database is created at Block 24 within the intranet server 12 on the visitor based upon information provided in the filled-out visitor request form.

A visitor approval request message is transmitted via e-mail to at least one evaluator at Block 26 based upon the visitor database if approval is required. The visitor approval request message has a hyperlink to the filled-out visitor request form. An approval recommendation is submitted by the evaluator at Block 28, and the visitor database is updated by the server 12 based upon the approval recommendation.

A determination is made at decision Block 30 if the user filling-out and submitting the visitor request form at Block 20 is hosting the visitor. If yes, the method continues and the visitor database is validated by the server 12 at Block 40. If no, then the method further comprises identifying a host of the visitor in the visitor request form at Block 32, and transmitting a certification recommendation message via e-mail to the host at Block 34. The certification recommendation message has a hyperlink to the filled-out out visitor request form. A certification recommendation by the host is submitted at Block 36, and the visitor database is updated by the server 12 at Block 38.

Updating the visitor database by the server 12 further includes validating the filled-out visitor request form at Block 40 if approval is received from all evaluators requiring their approval. The method further comprises issuing a visitor badge for the visitor at Block 42 based upon a validated filled-out visitor request form. The method ends at Block 42. The user filling-out and submitting the visitor request form also receives a message via e-mail indicating that the visit request has been validated. In addition, the person actually hosting the visitor may also receive such a message. If the visit request is disapproved, the user and person hosting the visitor would also receive such a message via e-mail.

The visitor badge comprises at least one of an escort required badge and a no escort required badge based upon a classification of the visitor. The VIS classifies the visitor as either a regular visitor or a foreign visitor. A regular visitor includes at least one of a U.S. citizen, and a non-U.S. citizen with an alien registration card. A foreign visitor includes at least one of a non-U.S. citizen without an alien registration card, a person representing a foreign company, and a person having dual citizenship.

If the visitor is classified as a foreign visitor, then the at least one evaluator is an import/export administrator. If classified material is to be discussed with the visitor, then the evaluator also includes a security administrator. If approval is not required by the security administrator, then the e-mail message serves as a notification that a foreign visitor will be attending a meeting where classified information will be discussed. Of course, other types of evaluators may be included as part of the approval process based upon the business environment of the corporation implementing the VIS.

As part of the web-based VIS process, a user's guide and reference may also be made available to describe the VIS process to an enrolled user. To access the guide, a user clicks on a help link displayed on a computer screen. Since the guide is context sensitive, clicking on the help link from different pages in the VIS application will bring the user to a relevant section in the guide. The available topics are listed in TABLE 1 below.

TABLE 1

| TOPICS | FUNCTION |
| --- | --- |
| GLOSSARY | Provides a list of the terms used in the VIS application. |
| OVERVIEW | Gives an overview of the VIS application. |
| LOG | Illustrates how to log visitors using the VIS application. |
| PREREGISTER | Describes how to pre-register visitors. |
| ACTION | Shows how to respond to a visit preregister request which needs action. |
| COUNTRIES | Illustrates how to add, edit, and void countries in the VIS database. |
| VISITORS | Details how to add and edit visitors in the VIS database. |
| APPLICATION ACCESS | Explains how to access the VIS application. |
| USERS | Shows how to give users special access to the VIS application. |
| SEARCH | Details the search abilities of the VIS application. |
| LIST | Demonstrates the search abilities of the VIS application. |
| DATABASE ERRORS | Explains what to do and the possible cause of database errors. |

Each of the topics listed in TABLE 1 will now be discussed in detail below. These topics and the discussion therein are for illustrative purposes only, and other types of user guides are acceptable for implementing the VIS, as readily appreciated by those skilled in the art. For instance, the illustrated VIS user's guide may be modified or changed to accommodate a particular business focus of a company or organization.

Overview:

The Overview topic provides an overview of the VIS application. The user is made aware that the web-based VIS application automates the process of logging, certifying, and printing temporary badges for visitors entering the facility. The VIS application also provides temporary badges for company employees and subcontractors. The user clicks on the displayed "VIS Requirements Document" prompt to open the VIS Requirements Document.

The Overview topic also discloses to the user that the VIS provides three types of temporary badges: 1) escort required (red) badge, 2) EXP escort required (red) badge, and 3) no escort required (yellow) badge. The EXP escort required badge is applicable to a foreign visitor, as will be described in greater below.

A Glossary topic provides a list of terms used throughout the VIS application. The list of terms are provided in TABLE 2.

TABLE 2

| TERM | DEFINITION |
| --- | --- |
| Import/Export Coordinator | A person from the import/export office. If the visitor is a foreign visitor, then an import/export coordinator must approve the visit. For more information refer to the import/export web page. |
| Foreign Person | A visitor where any one of the following is true:<br>1. A non-U.S. citizen without an I-551 alien registration form.<br>2. One who represents a foreign company.<br>3. One who has dual citizenship. |
| Guest | A friend or family member of a host who is visiting the facility. This system is not intended to handle guest visits. |
| Host | A company employee who receives visitors. |
| 1-551 Alien Registration Form | A valid and current alien registration receipt card (Green Card). Contact your import/export coordinator for further clarification. |
| Regular Person | A visitor or guest where any one of the following is true:<br>1. A U.S. citizen.<br>2. A non-U.S. citizen with an 1-551 alien registration form. |
| Requestor | One who initiates a visit pre-register request. |
| Save | Clicking on this button saves the information to the database. The state of the request remains unchanged. It overwrites the existing request. See also Submit. |
| Save New | Clicking on this button saves the information to the database. The state of the request remains unchanged. It saves the information as a new request. See also Submit New. |
| Submit | Clicking on this button saves the information to the database and submits the visit preregister request. This causes the VIS to validate the inputs, update the state of the request, save the data to the database, and send e-mail to the appropriate parties. It overwrites the existing request. See also Save. |
| Submit New | Clicking on this button saves the information to the database and submits the visit preregister request. This causes the VIS to validate the inputs, update the state of the request, save the data to the database, and send e-mail to the appropriate parties. It saves the information as a new request. See also Save New. |
| Visitor | A business contact who visits a |

TABLE 2-continued

| TERM | DEFINITION |
| --- | --- |
| | host. The business contact may be a foreign person or a regular person. |
| Visit Preregister Request | The request the host must submit prior to the visit to register the visitors. |

Log:

The Log topic illustrates how to log visitors using the VIS application. Only system administrators and receptionists may access this function. Authorized users may search the log entries, log a visitor, print a temporary badge, check out a visitor, or change the state of a log entry. Authorized users are also able to search the log database, list log entries edited today, and list all log entries in the database.

The steps to log a visitor are as follows:
1. From the index, click "Log";
2. Click "Log Visitor", this opens another window to search the preregistered visitors directory;
3. Employees/SubContractors;
4. Click on the visitor's name to add the visitor to today's log;
5. Click "Select Escort" to select an escort if the visitor must be escorted; and
6. Click "Print Badge" to print a temporary badge for the visitor.

The VIS application may also print the badges on index cards (3×5 in., e.g.), landscape oriented, with no headers, no footers, and with tailored margins, for example. The following details provide how to perform this one-time setup. The user's computer should save these selections.

Steps to configure a printer for printing badges are as follows:
1. Follow the "Steps to Log a Visitor" until after clicking "Print Badge";
2. Click "Cancel" to the print prompt;
3. Click "File", "Page Setup", and enter the margins in inches, Top 0, Bottom 0, Left 0.1, Right 0.1, and deselect header and footer checkboxes, and click "OK";
4. Click "File", "Print", and select the appropriate printer;
5. Click "Properties", and on "Setup" set the paper size to index card (3×5 in.), and on "Features" set orientation to landscape, and click "OK";
6. Insert the index card print-side down in either the envelope slot or the paper tray; and
7. Click "OK" to print the badge.

Preregister:

The Preregister topic describes how to preregister visitors. All users are to save or submit new visit preregister requests. All users are also able to search the visit preregister request database, list requests edited today, and list all requests in the database.

A request may be edited by the host if the state of the request in incomplete or import/export rejected. A request may be import/export rejected if it needs approval by an import/export coordinator. To edit a request, follow the "Steps to Edit a Visit Preregister Request".

A request may be edited by the requestor if the state of the request in incomplete, host rejected, or import/export rejected. A request may be host rejected if it needs approval by the host. To edit a request follow the "Steps to Edit a Visit Preregister Request". Users with special access to the VIS application may edit requests another way and void the requests. Follow the "Steps to Edit a Visit Preregister Request (Special Access Only)".

The VIS application may automatically change the state of the requests. However, administrators may also change the state of a request. To send e-mail, click "Submit", otherwise click "Save".

Visitors need to be pre-registered prior to the visit. One or more visitors may be registered at the same request. Foreign persons visiting the facility will require approval by the import/export coordinator. This may require at least five working days for processing.

If the request needs approval, the VIS will automatically e-mail the appropriate parties. If the request does not need approval, but the visitor needs a no-escort required badge, then the host may also have to complete a no escort required card, have it signed by a manager, and deliver it to a lobby receptionist prior to the visit.

When import/export compliance approves a request for a foreign person, the VIS will automatically e-mail security of the pending visit. The steps to preregister a visitor are as follows:
1. From the index, click "Preregister";
2. The host defaults to the user logged into the VIS application, to select a different host, click "Host Name", and this opens another window to search the employee directory;
3. Enter the host's last name and click "Search to list Employees";
4. Click on the host's name to add the host to the visit preregister request;
5. Click "Add/Delete Visitor(s)", and this opens another window to search the visitors directory, and follow instructions to select one or more visitors and click "Apply" to write the selected visitor(s) to the visit preregister request;
6. If the visitor is not in the database, then click "Add New" in the visitors directory window, enter the visitor's information, click "Save New", and continue; and
7. Enter all required data and click "Submit New".

The steps to edit a visit preregister request are as follows, but this is for special access only:
1. From the index, click "Preregister";
2. Search for the request;
3. Next to the request to edit, click with the pointer; and
4. Edit request and click "Submit".

Action:

The Action topic describes how to respond to a visit preregister request which needs action. The VIS application e-mails the appropriate parties for each visit preregister request which needs action. The Action link will only appear if there is a request requiring the action of the person logged into the VIS application.

How to open a visit preregister request requiring the attention of the user receiving the e-mail is as follows. From the e-mail, the user clicks on the link requesting action, or from the index. The user clicks on the "Action" topic and then clicks next to the preregister request. If the requester is not the same as the host, then the host must approve the request.

The steps to approve a visit preregister request whose state is awaiting host approval are as follows:
1. Open the visit preregister request;
2. Review the request, and make changes as needed; and
3. Click "Yes" for "Host certifies . . . " and click "Submit".

If the visitor is a foreign person then an import/export coordinator must approve the request. The steps to approve a visit preregister request whose state is awaiting import/export approval are as follows:
1. Open the visit preregister request;
2. Review the request, and make changes as needed; and
3. Click "Yes" for "Export Coordinator Approves?" and click "Submit".

If the import/export coordinator rejects a visit preregister request, then either the requester or the host can make the needed changes and re-submit the request. The steps to resubmit a visit preregister request whose state is import/export rejected are as follows:
1. Open the "Visit Preregister Request"; and
2. Make the appropriate changes, and click "Submit".

The steps to edit a visit preregister request are as follows:
1. From the index, click "Action", and the VIS application will only display this link if the user has requests awaiting the user's action;
2. Click next to the request to be edited; and
3. Edit the request and click "Submit".

Countries:

The Countries topic illustrate how to add, edit, and void countries in the VIS database. Only users with special access to the VIS application may access this function.

The VIS application maintains a list of countries available for import/export information. Users with special access to the Countries topic may add new countries, edit information for existing countries, search the countries database, list countries edited today, and list all countries in the database.

The steps to add a country are as follows:
1. From the index, click "Countries";
2. Click "Add New";
3. Enter the country's name, and the country's status defaults to available for import/export.
4. Click "Save New".

The steps to edit a country are as follows:
1. From the index, click "Countries";
2. Enter the country's name, and the checkbox will be automatically checked, and click "Search"; and
3. Click next to the country, and this opens another window, and edit the information and click "Save".

The steps to change the status of a country are as follows:
1. From the index, click "Countries";
2. Enter the country's name, and the checkbox will be automatically checked, and click "Search";
3. Click change "Status" next to the country; and
4. Click "OK" to confirm the change.

Visitors:

The Visitors topic provides details on how to add and edit visitors in the VIS database. Only users with special access to the VIS application may access this function.

The VIS maintains a list of visitors. Users with special access to this application may add new visitors, edit information for existing visitors, search the visitors database, list visitors edited today, and list all visitors in the database.

The steps to add a visitor are as follows:
1. From the index, click "Visitors";
2. Click "Add New";
3. Enter the visitor's information; and
4. Click "Save New".

The steps to edit a visitor are as follows:
1. From the index, click "Visitors";
2. Enter the visitor's last name, and the checkbox will be automatically checked, and click "Search"; and
3. Click next to visitor's name, and this opens another window, and edit the information and click "Save".

Application Access:

The Application Access topic explains how to access the VIS application. Users with a valid NT userid have normal access to this system. To obtain special access to the VIS application, the user is to contact the VIS Administrator. The user is to specify the type of access desired. TABLE 3 lists the types of access to the VIS.

TABLE 3

| ACCESS | DESCRIPTION |
| --- | --- |
| Normal | Users with a valid NT userid may access the VIS. These users are NOT maintained by the VIS. Normal users can preregister a visit and add new visitors |
| Export Coordinator | These users are maintained by the VIS. Import/export compliance have access to the preregister and countries link and can approve visit preregister request which need import/export compliance approval. |
| Coordinator | These users are maintained by the VIS. Coordinators have access to the preregister, countries, and visitors link. |
| Receptionist | These users are maintained by the VIS. Coordinators have access to the preregister, countries, and visitors link. |
| Administrator | These users are maintained by the VIS. Administrators have access to all links, but cannot approve visit preregister request which need import/export compliance approval. |

Users:

The Users topic shows how to provide users special access to the VIS. Only administrators may access this function. All users requiring special access to the VIS must be maintained in the VIS database.

This page displays all users with special access to the VIS, and lists users by last name. The user may sort the listing by clicking on the column headers buttons. The following TABLE 4 describes each column header. The system also time stamps changes made to a log entry with an employee's serial number and a time/date.

TABLE 4

| COLUMN HEADER | DESCRIPTION |
| --- | --- |
| Delete | Click delete to delete information for a user. Sorting by this column is not supported. |
| Edit | Click edit to update information for a user. Sorting by this column is not supported. |
| Name | Name of the user. Click on the user's name to send an e-mail to this person. |
| Serial | Serial number of the user. |
| Userid | NT userid of the user. |
| Role | Role of the user may be one of the following: administrator, receptionist, coordinator, or import/export compliance. Refer to description of the VIS roles for further details. |

The steps to provide a user special access to the VIS are as follows:
1. From the index, click "Users" to display the users page;
2. Click "Add New User";
3. Click "Select User", this opens a new page, and follow the directions on this page to locate the user in MUD, select desired name and this automatically fills in the user's information;
4. Select a role for the user or take the default; and
5. Click "Save New User".

The Steps to edit information for a user are as follows:

1. From the index, click "Users" to display the users page;
2. Click next to "User";
3. Only role may be changed directly, and click "Select User" to get MUD updates for this user; and
4. Click "Save User Updates" and then confirm update.

The steps to revoke special access from a user are as follows:
1. From the index, click "Users" to display the users page; and
2. Click "Delete" next to the user and then confirm delete.

Search:

The Search topic details the search abilities of the VIS. The user selects one or more filters to reduce the number of records returned from the database. Some filters have text information that must be filled if selected. The selected filters are combined together to produce the search criteria.

The steps to search for complete visit preregister request requested by the user are as follows:
1. From the index, click preregister;
2. Click "Search";
3. From the preregister state drop-down list select "Complete" and enter the user's last name in the requester name field, and the checkboxes will be automatically checked; and
4. Click "Search".

List:

The List topic demonstrates the list features of the VIS. The VIS displays the result of a search in a list. "List Todays" and "List All" are canned searches. The VIS application displays the list sorted by the column whose column header is highlighted in a specific color, such as blue, for example. Some columns provide a button in the header. Click on that button to resort the list by that column. To view an item, click on the item's name.

The steps to view a visit preregister request are as follows:
1. From the index, click preregister;
2. Click "Search";
3. Enter the search criteria and click "Search"; and
4. Click on the "View Preregister No", this opens another window with the visit preregister request.

The steps to print a visit preregister request are as follows:
1. Follow the steps to view a visit preregister request; and
2. After the window finishes loading, click the web browser's "Print Icon".

Database Errors:

The Database Errors topic explains what to do and the possible cause of database errors. If the VIS encounters a database error, possibly the query is incorrect or the server 12 is down. If the problem persists, the user is to contact the VIS Administrator for assistance.

Another aspect of the present invention relates to an intranet 10 for processing a visitor request. The intranet 10 comprises a first software module for filling-out and submitting a visitor request form, and a second software module for creating a visitor database on the visitor based upon information provided in the filled-out visitor request form. A third software module is for transmitting a visitor approval request message via e-mail to at least one evaluator based upon the visitor database if approval is required, with the visitor approval request message having a hyperlink to the filled-out visitor request form. A fourth software module is for submitting an approval recommendation by the at least one evaluator for updating the visitor database.

Yet another aspect of the present invention is directed to a computer-readable medium having stored thereon a data structure. The computer-readable medium comprises a first data field containing data representing a visitor request form, with the filled-out visitor request form to be submitted over an intranet 10. The computer-readable medium further includes a second data field containing data representing an e-mail message having a hyperlink to the data representing the filled-out visitor request form, with the e-mail message to be transmitted to at least one evaluator if approval is required. A third data field contains data representing an approval recommendation by the at least one evaluator, with the comments to be transmitted via e-mail.

Many other modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for processing a visitor request over an intranet for a visitor visiting an organization, the method comprising:
using the intranet within the organization for filling-out a visitor request form;
submitting the filled out visitor request form over the intranet only within the organization;
creating a visitor database on the visitor based upon the, filled-out visitor request form;
transmitting a visitor approval request message via e-mail to at least one evaluator within the organization if approval is required, the visitor approval request message having a hyperlink to the filled-out visitor request form; and
submitting an approval recommendation by the at least one evaluator via email for updating the visitor database.

2. A method according to claim 1 wherein the e-mail corresponding to the visitor approval request message is transmitted at least in part over the intranet; and wherein the e-mail corresponding to the approval recommendation is transmitted at least in part over the intranet.

3. A method according to claim 1 further comprising validating the updated filled-out visitor request form.

4. A method according to claim 1 further comprising issuing a visitor badge based upon a validated filled out visitor request form.

5. A method according to claim 4 wherein the visitor badge comprises at least one of an escort required badge and a no escort required badge.

6. A method according to claim 1 wherein if a user filling-out and submitting the visitor request form is not hosting the visitor, then the method further comprises:
identifying a host of the visitor in the filled-out visitor request form;
transmitting a visitor certification request message via e-mail to the host, the visitor certification request message having a hyperlink to the filled out visitor request form; and
submitting a certification recommendation by the host via e-mail for updating the visitor database.

7. A method according to claim 1 further comprising classifying the visitor as either a regular visitor or a foreign visitor.

8. A method according to claim 7 wherein a regular visitor comprises at least one of a U.S. citizen, and a non-U.S. citizen with an alien registration card.

9. A method according to claim 7 wherein a foreign visitor comprises at least one of a non-U.S. citizen without an alien registration card, a person representing a foreign company, and a person having dual citizenship.

10. A method according to claim 1 wherein the at least one evaluator comprises at least one of a security administrator and an import/export administrator.

11. A method according to claim 1 further comprising transmitting a status message via e-mail to a user filling-out and submitting the visitor request form.

12. A method for processing a visitor request over an intranet for a visitor visiting an organization, the method comprising:
   using the intranet within the organization for filling-out a visitor request form;
   submitting the filled-out visitor request form over the intranet only within the organization;
   creating a visitor database on the visitor based upon the filled-out visitor request form including classification of the visitor as a regular visitor or a foreign visitor;
   transmitting a visitor approval request message via e-mail to at least one evaluator within the organization if approval is required, the visitor approval request message having a hyperlink to the filled-out visitor request form;
   submitting an approval recommendation by the at least evaluator via e-mail; and
   issuing a visitor badge based upon a validated filled-out visitor request form.

13. A method according to claim 12 further comprising:
   updating the filled-out visitor database based upon the received approval recommendations; and
   validating the updated filled-out visitor request form.

14. A method according to claim 12 wherein the e-mail corresponding to the visitor approval request message is transmitted at least in part over the intranet; and wherein the e-mail corresponding to the approval recommendation is transmitted at least in part over the intranet.

15. A method according to claim 12 wherein the visitor badge comprises at least one of an escort required badge and a no escort required badge.

16. A method according to claim 12 wherein if a user filling-out and submitting the visitor request form is not hosting the visitor, then the method further comprises:
   identifying a host of the visitor in the filled-out visitor request form;
   transmitting a visitor certification request message via e-mail to the host, the visitor certification request message having a hyperlink to the filled-out visitor request form; and
   submitting a certification recommendation by the host for updating the visitor database.

17. A method according to claim 12 wherein classification of the visitor as a regular visitor comprises at least one of a U.S. citizen, and a non-U.S. citizen with an alien registration card.

18. A method according to claim 12 wherein classification of the visitor as a foreign visitor comprises at least one of a non-U.S. citizen without an alien registration card, a person representing a foreign company, and a person having dual citizenship.

19. A method according to claim 12 wherein the at least one evaluator comprises at least one of a security administrator and an import/export administrator.

20. A method according to claim 12 further comprising transmitting a status message via e-mail to a user filling-out and submitting the visitor request form.

21. An intranet for processing a visitor request for a visitor visiting an organization, the intranet comprising:
   at least one computing device storing a plurality of software modules, said plurality of software modules comprising
   a first software module for filling-out and submitting a visitor request form within the organization, the filled-out visitor request form being submitted over the intranet only within the organization;
   a second software module for creating a visitor database on the visitor based upon information provided in the filled-out visitor request form;
   a third software module for transmitting a visitor approval request message via e-mail to at least one evaluator within the organization based upon the visitor database if approval is required, the visitor approval request message having a hyperlink to the filled-out visitor request form; and
   a fourth software module for submitting an approval recommendation by the at least one evaluator for updating the visitor database.

22. An intranet according to claim 21 wherein the email corresponding to the visitor approval request message is transmitted at least in part over the intranet; and wherein the e-mail corresponding to the approval recommendation is transmitted at least in part over the intranet.

23. An intranet according to claim 21 wherein said fourth software module also validates the filled-out visitor request form if approval is received from all evaluators.

24. An intranet according to claim 21 wherein said at least one computing device further stores a fifth software module for issuing a visitor badge based upon a validated filled-out visitor request form.

25. An intranet according to claim 24 wherein the visitor badge comprises at least one of an escort required badge and a no escort required badge.

26. An intranet according to claim 21 wherein if a user filling-out and submitting the visitor request form is not hosting the visitor, then said at least one computing device further stores:
   a sixth software module for identifying a host of the visitor in the filled-out visitor request form, and transmitting a visitor certification request message via e-mail to the host, the visitor certification request message having a hyperlink to the filled-out visitor request form; and
   a seventh software module for submitting a certification recommendation by the host via e-mail for updating the filled-out visitor database.

27. An intranet according to claim 21 wherein said second software module also classifies the visitor as either a regular visitor or a foreign visitor.

28. An intranet according to claim 27 wherein a regular visitor comprises at least one of a U.S. citizen, and a non-U.S. citizen with an alien registration card.

29. An intranet according to claim 27 wherein a foreign visitor comprises at least one of a non-U.S. citizen without an alien registration card, a person representing a foreign company, and a person having dual citizenship.

30. An intranet according to claim 21 wherein the at least one evaluator comprises at least one of a security administrator and an import/export administrator.

31. An intranet according to claim 21 wherein said at least one computing device further stores an eighth software module for transmitting a status message via e-mail to a user filling-out and submitting the visitor request form.

32. A computer-readable medium having stored thereon a data structure and a program,
   the data structure comprising:

a first data field containing data representing a visitor request form for a visitor visiting an organization, the filled-out visitor request form being submitted over an intranet only within the organization;

a second data field containing data representing an e-mail message having a hyperlink to the data representing the filled-out visitor request form, the e-mail message to be transmitted to at least one evaluator within the organization if approval is required; and a third data field containing data representing an approval recommendation by the at least one evaluator, the comments to be transmitted via e-mail;

wherein the program uses the first, second and third data fields for causing a user computer connected to the intranet to process the visitor request over the intranet for the visitor visiting the organization.

33. A computer-readable medium according to claim 32 wherein the data structure further comprises:

a fourth data field containing data representing a database on the visitor based upon information provided in the filled-out visitor request form; and a fifth data field containing data for updating the visitor database.

34. A computer-readable medium according to claim 32 wherein the data structure further comprises a sixth data field containing data for validating the filled-out visitor request form if all evaluators approve.

35. A computer-readable medium according to claim 32 wherein the data structure further comprises a seventh data field for containing data for issuing a visitor badge based upon a validated filled-out visitor request form.

36. A computer-readable medium according to claim 35 wherein the visitor badge comprises at least one of an escort required badge and a no escort required badge.

37. A computer-readable medium according to claim 32 wherein if a user that created the visitor request form is not hosting the visitor, then the data structure further comprises:

an eighth data field for containing data for identifying a host of the visitor in the filled-out visitor request form;

a ninth data field for containing data representing an e-mail message having a hyperlink to the data representing the filled-out visitor request form, the e-mail message to be transmitted to the host; and a tenth data field for containing data representing a certification recommendation by the host, the comments to be transmitted via e-mail.

38. A computer-readable medium according to claim 33 wherein said fourth data field further contains data classifying the visitor as either a regular visitor or a foreign visitor.

39. A computer-readable medium according to claim 38 wherein a regular visitor comprises at least one of a U.S. citizen, and a non-U.S. citizen with an alien registration card.

40. A computer-readable medium according to claim 38 wherein a foreign visitor comprises at least one of a non-U.S. citizen without an alien registration card, a person representing a foreign company, and a person having dual citizenship.

* * * * *

UNITED STATES PATENT AND TRADEMARK OFFICE
CERTIFICATE OF CORRECTION

PATENT NO.       : 7,441,004 B2  
APPLICATION NO.  : 09/988907  
DATED            : October 21, 2008  
INVENTOR(S)      : Lip et al.

Page 1 of 1

It is certified that error appears in the above-identified patent and that said Letters Patent is hereby corrected as shown below:

Column 3, Line 56    Delete: "internet"  
                     Insert: -- intranet --

Column 3, Line 57    Delete: "internet"  
                     Insert: -- intranet --

Column 11, Line 32   Delete: "resort"  
                     Insert: -- re-sort --

Column 12, Line 24   Delete: "the,"  
                     Insert: -- the --

Column 13, Line 22   Delete: "at least"  
                     Insert: -- at least one --

Signed and Sealed this

Third Day of February, 2009

JOHN DOLL  
*Acting Director of the United States Patent and Trademark Office*